US012762936B2

(12) United States Patent
Kretsch

(10) Patent No.: US 12,762,936 B2
(45) Date of Patent: Oct. 13, 2026

(54) ELECTRONIC MONITORING SYSTEM WITH INTUITIVE ACTIVITY ZONE DEFINITION

(71) Applicant: Arlo Technologies, Inc., Carlsbad, CA (US)

(72) Inventor: Mark Kretsch, Carlsbad, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 467 days.

(21) Appl. No.: 17/841,200

(22) Filed: Jun. 15, 2022

(65) Prior Publication Data

US 2023/0410620 A1 Dec. 21, 2023

(51) Int. Cl.
*G06V 20/52* (2022.01)
*G06V 40/10* (2022.01)
*G08B 13/196* (2006.01)

(52) U.S. Cl.
CPC ....... *G08B 13/19643* (2013.01); *G06V 20/52* (2022.01); *G06V 40/103* (2022.01)

(58) Field of Classification Search
CPC .............. G08B 13/19643; G08B 29/22; G08B 13/1968; G08B 13/19632; G08B 13/19695; G06V 20/52; G06V 40/103
See application file for complete search history.

(56) References Cited

U.S. PATENT DOCUMENTS 6,309,090 B1 * 10/2001 Tukin .................. H05B 47/115 340/567
7,467,881 B2 * 12/2008 McMillen ........... F21V 33/0076 362/147
8,232,745 B2 * 7/2012 Chemel .................. H05B 47/19 315/307
9,338,850 B2 * 5/2016 Cannon .................. H05B 45/10
9,820,358 B2 * 11/2017 Takahashi .............. H05B 47/11
10,778,887 B1 * 9/2020 Xu ......................... H04N 23/61
10,854,060 B2 12/2020 Siminoff et al.
2005/0116171 A1 * 6/2005 Lee ..................... F21V 23/0442 250/342
2007/0018106 A1 * 1/2007 Zhevelev .................. G01J 5/07 250/353
2009/0225166 A1 * 9/2009 Dronge ........... G08B 13/19695 382/218
2009/0237509 A1 * 9/2009 Saxon .................... H04N 7/183 348/155

(Continued)

FOREIGN PATENT DOCUMENTS

CN 105959517 B 12/2018

OTHER PUBLICATIONS

U.S. Appl. No. 18/106,776, filed Feb. 7, 2023.
U.S. Appl. No. 17/841,179, filed Jun. 15, 2022.

*Primary Examiner* — Henok Shiferaw
*Assistant Examiner* — Woo C Rhim
(74) *Attorney, Agent, or Firm* — Boyle Fredrickson, S.C

(57) ABSTRACT

An area monitoring system is provided that allows flexible definitions of activity zones for activating a camera by using articulated motion detectors defining fields-of-view as subsets of the camera field-of-view. First and second motion detectors may be mounted on an escutcheon on opposite sides of the camera such that the first and second motion detectors may swivel independently of one another and of the camera.

17 Claims, 3 Drawing Sheets

(56) References Cited

U.S. PATENT DOCUMENTS

| | | | | |
|---|---|---|---|---|
| 2015/0070897 | A1* | 3/2015 | Chien | F21V 14/02 362/269 |
| 2015/0102226 | A1* | 4/2015 | Monaci | G08B 13/19 250/347 |
| 2015/0325092 | A1* | 11/2015 | Zhevelev | G08B 13/22 348/155 |
| 2018/0033273 | A1* | 2/2018 | Siminoff | H04N 23/20 |
| 2018/0174413 | A1* | 6/2018 | Siminoff | H04N 7/186 |
| 2018/0268673 | A1* | 9/2018 | Amir | H04N 23/23 |
| 2018/0293863 | A1* | 10/2018 | Tavares | G08B 15/00 |
| 2019/0059142 | A1* | 2/2019 | Chen | F21V 15/01 |
| 2020/0090480 | A1* | 3/2020 | Sacre | G01P 13/00 |
| 2021/0352300 | A1* | 11/2021 | Amini | H04W 52/0245 |
| 2021/0356276 | A1* | 11/2021 | Richman | H04N 21/25841 |
| 2022/0116535 | A1* | 4/2022 | Gaw | G06T 7/277 |
| 2022/0284783 | A1* | 9/2022 | Wang | G08B 13/19656 |
| 2024/0200763 | A1* | 6/2024 | Shih | F16M 11/041 |

* cited by examiner

FIG. 5
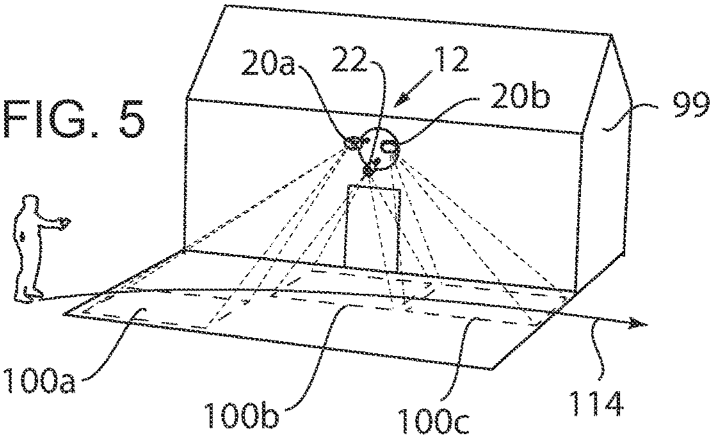
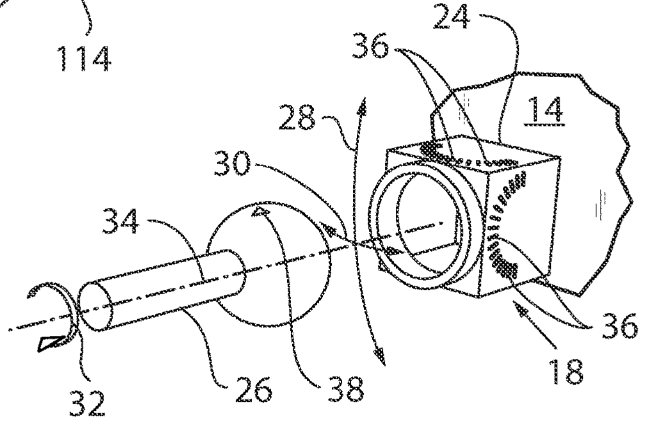
FIG. 4
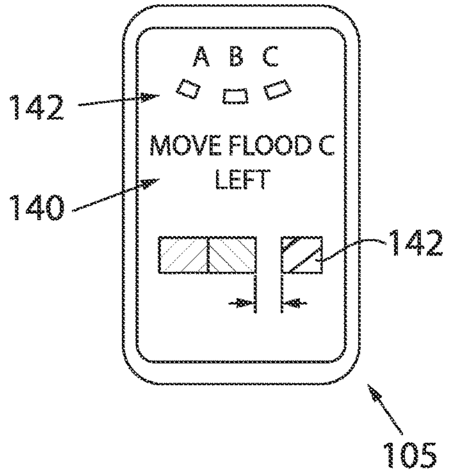
FIG. 7
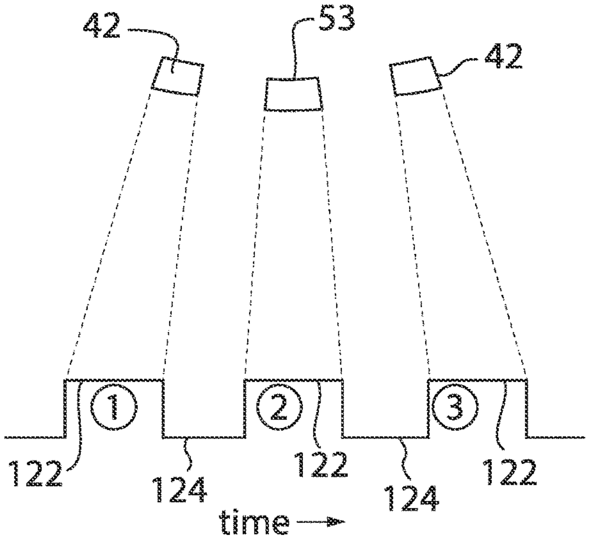
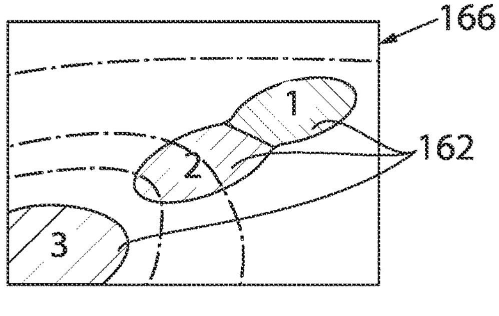
FIG. 9
FIG. 8

ELECTRONIC MONITORING SYSTEM WITH INTUITIVE ACTIVITY ZONE DEFINITION

BACKGROUND OF THE INVENTION

1. Field of the Invention

The present invention relates to an electronic monitoring system and, more particularly, to an electronic monitoring system that allows for flexible definition of contiguous or noncontiguous activity zones.

2. Discussion of the Related Art

Cameras have long been used as part of monitoring and/or surveillance systems. More recently, cameras have been coupled with electronic sensors to detect triggering events, such as a detected motion, to initiate image capturing and recording of an area once a triggering event has occurred. In one example, a wide-angle passive infrared detector (PIR) is attached to the camera providing a field-of-view (FOV) approximating that of the camera. When the PIR is triggered by motion within an "activity zone" defined by the PIR FOV, the camera may be activated to capture and record video. In some cases, the image of the camera is used to define one or more activity zones that are smaller than the camera's FOV. The size and location of the activity zone within the larger FOV can be user-specified.

The cameras in such systems are frequently battery-powered, and combining the camera with a PIR detector can reduce power consumption by allowing initial motion detection by the low-power consumption PIR detector and activation of the high-power consumption camera only as needed.

When a wide angle PIR detector is employed in such combined camera/PIR systems, background motion (traffic, etc.) can undesirably cause repeated false triggering of the camera. Thus, there if a need to provide an improved system of motion detection that permits flexible definition of an activity zone of the camera so as to prevent nuisance triggers.

SUMMARY OF THE INVENTION

In accordance with a first aspect of the invention, this and possibly other needs are satisfied by providing an imaging device including set of articulated motion sensors having limited fields of view and that can be directed to particular locations to intuitively define activity zones within the field of view ("FOV") of a camera. Setting these locations by movement of articulated joints provides an intuitive and rapid method of defining activity zones so as to avoid nuisance triggers.

The system may include an electronic monitoring system having an escutcheon attached to a camera, the latter for capturing video images within a camera field-of-view when the camera is activated. A first and second motion detector detect motion in respective first and second fields of view and are independently attached to the escutcheon by articulated joints allowing adjustment of the first and second field-of-views in elevation and azimuth. The first and second motion detectors provide an electronic motion signal upon detection of motion in the respective field-of-view. The camera and the first and second motion detectors intercommunicate to activate the camera in response to an electronic motion signal of at least one of the first and second motion detectors.

A nonlimiting feature of this embodiment is the ability to flexibly define activity zones for activating the camera by movement of the motion sensors independently of the camera in distinction from typical camera-mounted, wide-area motion sensors.

The camera field-of-view may be larger in area in than the field-of-view of the first and second motion detectors.

A nonlimiting feature of this embodiment is the ability to flexibly define activity zones within the camera field-of-view.

The articulated joints may provide both azimuthal and elevational angulation.

A nonlimiting feature of this embodiment is the ability to elevate the fields of view of individual motion detectors in areas where background motion may not be a problem.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Exemplary embodiments of the invention are illustrated in the accompanying drawings in which like reference numerals represent like parts throughout, and in which:

FIG. 4 is a fragmentary view of an articulated joint allowing motion in elevation, azimuth, and rotation and providing indicia delineating such positioning;

FIG. 5 is a simplified view of an installation of the escutcheon of FIGS. 1 and 2 showing the ability to define activity zones that vary in azimuth and elevation;

FIG. 7 is a display of a portable device that may be used during the alignment process of FIG. 6 to indicate adjustments necessary for gap-less activity zones;

FIG. 8 is a simplified representation of the field-of-view of the motion sensors and the camera showing the ability to define activity zones within the field-of-view of the camera; and FIG. 9 is a graphical display showing activity zones superposed on a camera image to assist in adjustment of those regions.

DETAILED DESCRIPTION

Figure 1:
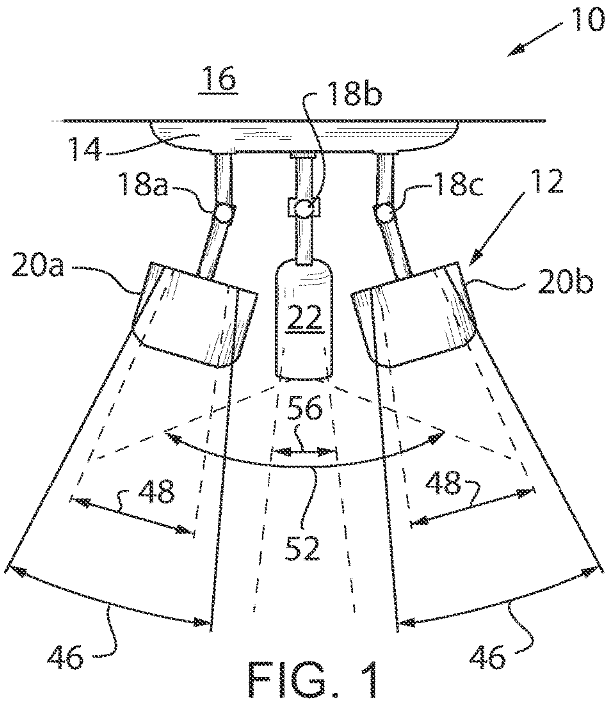
FIG. 1 is a top plan view of a wall-mountable escutcheon providing independently articulated floodlights and camera, each incorporating a motion detector and generally showing the fields-of-view of the motion detector and the camera.
Figure 2:
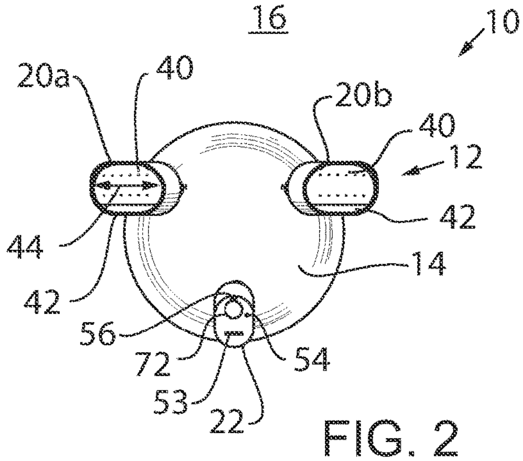
FIG. 2 is a front elevational view of the escutcheon of FIG. 1, showing the sensing regions of the motion detectors, the camera lens and floodlight elements, and camera illumination, and showing an electronic controller that may execute a stored program and wireless transceiver for communication with one or more remote portable devices.

Referring now to FIGS. 1 and 2, in accordance with an aspect of the invention, an electronic system 10 for real-time monitoring may include a camera/floodlight assembly 12 configured to monitor an area of interest. The system 10 may additionally include more than one such assembly 12 and/or other monitoring and/or imaging devices or assemblies such as a stand-alone surveillance camera, a video doorbell, smoke detectors, etc. These devices and assemblies may communicate wirelessly with each other and also may communicate wirelessly with an external server and one or more user devices via a gateway router or simply router, possibly with the assistance of a base station as described below.

Still referring to FIGS. 1 and 2, the camera/floodlight assembly 12 has an escutcheon 14, for example, that may mount against a building wall 16, a soffit, a fence, a light pole, or the like and which provides a support plate for the camera/floodlight assembly 12. The escutcheon 14 may have a hollow rear face to receive and cover electrical connections to an electrical main or the like as well as physical connections of the escutcheon 14 to the wall 16 by screws or bolts as is generally understood in the art.

The front surface of the escutcheon 14 may support three articulated joints 18*a*-18*c* extending forward therefrom to attach respectively to rear surfaces of a first motion detector floodlight 20*a*, an imaging device or a camera module 22, and a second motion detector/floodlight assembly 20*b*, respectively. Unless otherwise specified, the presence of a numerical reference character such as “20”, unaccompanied by an alphabetical designator such as “a” or “b”, should be understood to refer to any or all of the devices designated by the a combination of the numerical and alphabetical components. Hence, “20” standing alone should be understood to refer to either or both of 20*a* and 20*b* and “18” standing alone should be understood to refer to any or all of 18*a*, 18*b*, and 18*c*.

Referring momentarily to FIG. 4, each articulated joint 18 may provide for a fixed portion 24 attached to the escutcheon 14 and a movable portion 26 attached to the rear surfaces of the motion detector, floodlights 20 and camera module 22. In one embodiment, the movable portion 26 may be positioned with respect to the escutcheon 14 at various angles in elevation 28 and azimuth 30 and may pivot 32 about a central axis 34 generally aligned with the axes of sensitivity of the motion detector, floodlights 20 and camera module 22. In a typical orientation shown in FIG. 2, the elevation 28 will be vertical, the azimuth 30 will be horizontal, and central axis 34 will extend generally in a horizontal direction when the articulated joint 18 is centered in azimuthal and elevational movement. Indicia 36, for example, molded embossments or printed markings, may be provided on the fixed portion 24 to guide the setting of the angles of azimuth and elevation, and similar indicia 38 may be placed on the movable portion 26 to guide pivoting motion.

Referring again to FIGS. 1 and 2, each of the motion detector floodlights 20 will include an upper floodlight assembly 40 that typically has multiple LED emitters directed forwardly to emit in excess of 500 lm generally along the central axis 34 when the motion detector floodlight 20 is centered in azimuth and elevation. Positioned beneath the floodlight assembly 40 is a forward facing passive infrared (PIR) detector 42. The floodlight assembly 40 will generally have a greatest extent along a width 44 (typically horizontally oriented) matching a greatest width of its illumination pattern 46 and also matching a greatest width of the field-of-view (FOV) 48 of the associated PIR detectors 42.

Referring still to FIGS. 1 and 2, the camera module 22 includes at least a video camera 70, and may additionally include other components found in imaging devices of monitoring systems, including one or more of a motion sensor, a microphone, a speaker, and an alarm. Camera 70 has a forward facing wide-angle lens 72 providing a camera field-of-view (FOV) 52 that may, for example, be greater than 100° and typically greater than 160° in azimuth. The camera module 22 will also include an integrated PIR detector 53 having a field-of-view width 56 centered on the field-of-view 58. This FOV may be smaller than that field-of-view 58. It may also define a fixed or user-settable activity zone. A light source 57 is provided on a front face of the camera module 22 emitting infrared or visible light to provide light for the camera 70, but at an intensity generally much less than the light provided by the floodlight assembly 40. An indicator light 54 may be provided indicating activation of the PRI detector 53 by motion of an infrared emitting body such as an individual passing within the field-of-view 56. An ambient light sensor 71 is provided, for example, to suppress operation of the floodlight assembly during daylight hours.

Figure 3:
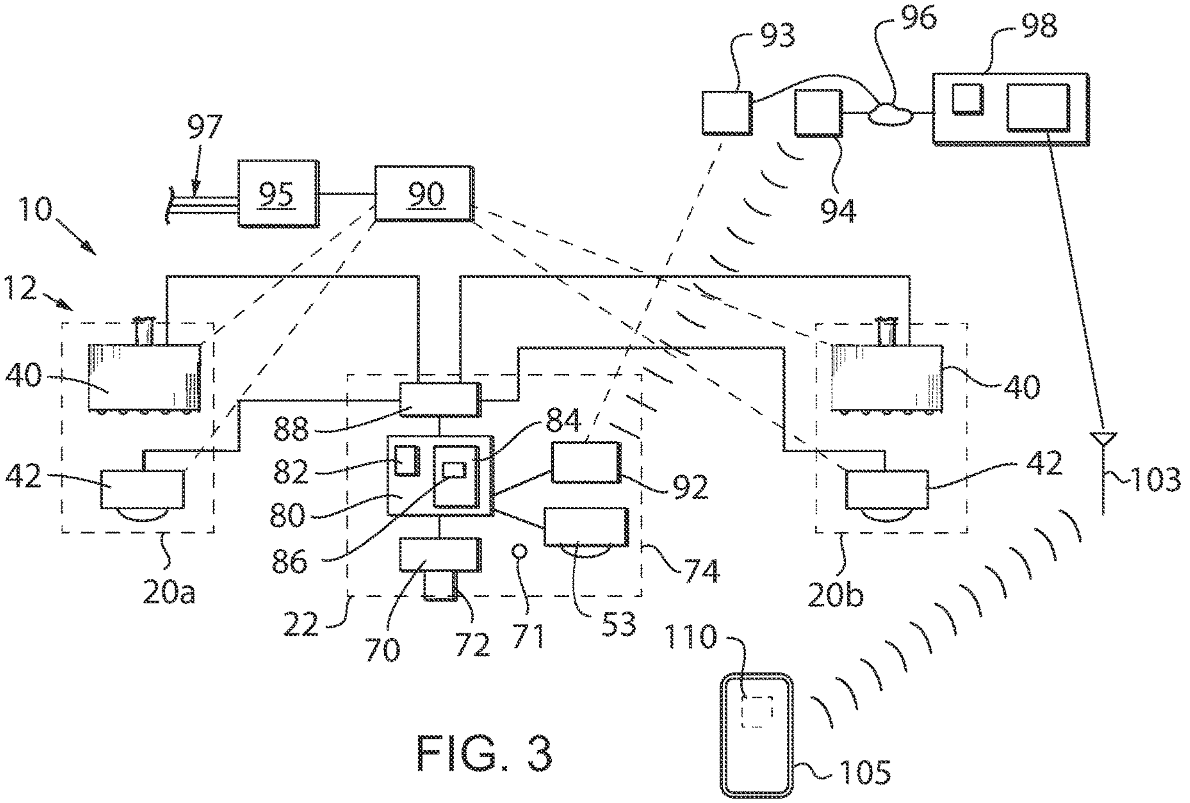
FIG. 3 is an electronic block diagram showing the circuitry controlling and associated with the motion detectors, cameras, and floodlights of FIGS. 1 and 2

Referring now to FIG. 3, in one embodiment, the camera module 22 may provide for the camera 70, which may be a CCD, and lens assembly 72 for obtaining video images, for example, at 2K HDR using a CMOS sensor or other sensing technology. A housing 74 of the camera module 22 holding the sensor 70 may also hold the PIR detector 53 with both the PIR detector 53 and camera 70 communicating with an internal microcontroller 80. The microcontroller 80, for example, may provide for a processor 82 and a non-transient electronic memory 84 holding a stored program 86 to be executed by the microcontroller 80, at least in part, as will be discussed below. As is generally understood in the art, the microcontroller 80 may also include one or more interface lines for communicating with the camera 70, the PIR detector 53, the ambient light detector 71, and an interface 88 (for example, the $I^2C$ protocol) allowing communication with other elements of the camera/floodlight assembly 12. In particular, the interface 88 may communicate with floodlight assemblies 40 of each of the motion detector floodlights 20*a* and 20*b* to provide signals independently turning the floodlight assemblies 40 on and off, and with the PIR detectors 42 of each of the motion detector floodlights 20*a* and 20*b* to receive signals therefrom. As will be discussed below, the floodlight assemblies 40 generally will include necessary driver circuitry so that they can be activated by the camera module 22 by remote command or be dependent on the receipt of electrical signals indicating motion from the PIR detectors 42 or 53.

Importantly, the microcontroller 80 may also communicate with a wireless transceiver 92, for example, using the IEEE 802.11 standards in accordance with the Wi-Fi™ communication protocol. The wireless transceiver 92 may communicate with a base station 93 or wireless router 94, for example, in the user’s home, and via either of these devices, through the Internet 96 with remote server 98, which may be a cloud-based server, including one or more computer processors. The remote server 98 may in turn communicate with the cellular network 103 providing communication with user devices, typically in the form of portable wireless devices 105 such as a smart phone, tablet, or laptop. It also could provide communications with one or more stationary devices such as a PC. As is understood in the art, such wireless portable devices 105 may include one or more internal processors, a computer memory holding stored programs in the form of applications, a wireless transceiver, and a display such as a touchscreen or the like allowing for inputs from a user and the display of graphical or text information, as well as a speaker and microphone for delivering and receiving voice commands. Such portable wireless devices 105 are typically battery-powered so as to be carried by a user if desired during the processing be described herein.

Generally, it will be understood that the logic to be described with respect to the operation of the system 10 may be distributed among multiple processors variously within the camera module 22, a base station 93 and/or a router 94 in the user's house, or the central server 98.

An internal battery 90, provided with recharging capabilities from charger unit 95 connected to line voltage 97, may provide power to each of the floodlight assemblies 40, the circuitry of the PIR detectors 42, and the circuitry associated with the camera module 22 within housing 74.

Referring now to FIG. 5, when the camera/floodlight assembly 12 is attached to a structure 99 such as a home, building, post, fence or the like, the PIR detectors 42 and 53 in the respective individual motion detector floodlights 20*a*, 20*b* and camera module 22 may be independently positioned and aligned to define multiple activities zones 100*a*, 100*b*, and 100*c*. These multiple activities zones 100*a*, 100*b*, and 100*c* may be located freely at different elevational and azimuthal positions, being generally left and right positions with respect to the structure 99. They also may extend different distances from the structure 99. This is in contrast to a conventional camera-attached, wide-angle PIR which can provide only a linear contiguous activity zone at a fixed elevation and azimuth with respect to the camera module 22. While the activities zones 100 are shown as approximately square, in practice they may be much wider than tall. The ability to swivel the PIR detectors 42 in their respective motion detector floodlights 20 using the pivoting of joint 18 allows these elongated zones to be flexibly oriented, for example, angled paths or regions.

This freedom of positioning of the motion detector floodlights 20 independent of the camera module 22 allows additional flexibility in locating the activity zones 100 (and thus triggering of the camera module 22) permitting the activity zones 100 to be discontinuous or at different elevations in areas of interest where there is no concern about undesirable background motion. This flexibility is accommodated, while preserving the ability to define contiguous activities zones 100 producing a continuous perimeter border, by providing a tool allowing the user to properly identify and locate these activities zones 100 and to ensure that they are contiguous when so desired.

Referring now to FIGS. 3, 5, 6, and 7, this tool may be activated by the user as indicated by process block 102, for example, using a portable wireless device 105, and may execute any of the processors described above with respect to FIG. 2, for example, implemented by an application program 110 held, in part, on the portable wireless device 105 and, in part, on the server 98, the microcontroller 80, and a processor associated with a base station 93.

Figure 6:
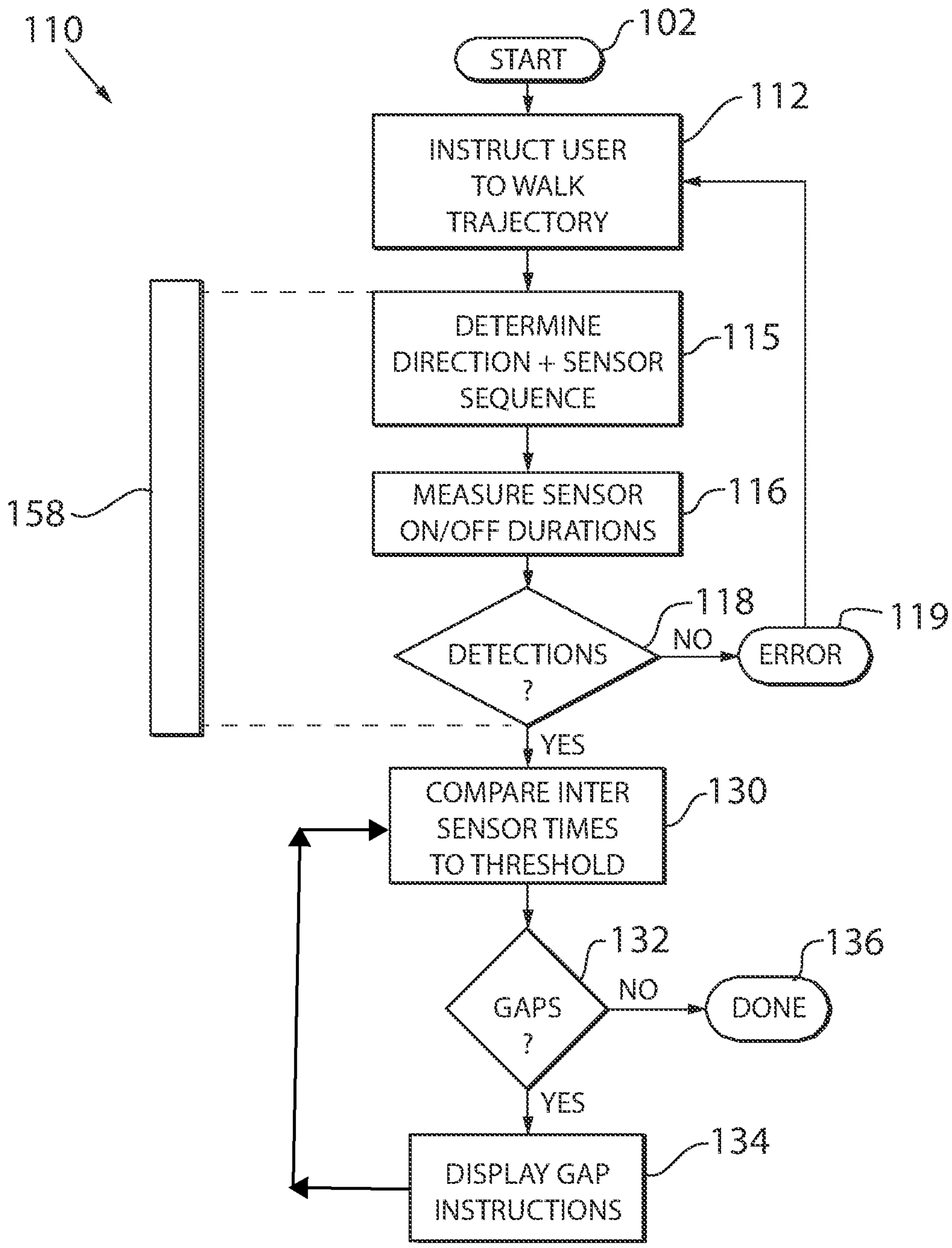
FIG. 6 is a flowchart showing execution of the stored program by the computer of FIG. 3 for implementing an alignment of motion detectors according to one embodiment of the present invention.

As indicated by process block 112 of FIG. 6, the program 110 may instruct the user to walk a trajectory 114 selected to pass through desired activity zones 100 determined by the user. This instruction may be by text, a tone or series of tones, or voice message, for example, output on the portable wireless device 105. The program 110 then waits at process block 115 to receive a signal from the camera module 22 indicating detection of the user by one of the PIR detectors 42 or 53. A first detection event generally indicates the direction of the trajectory 114. For example, if the first detection event is the leftmost PIR detector 42, a trajectory from left to right will be inferred, otherwise a right to left trajectory will be inferred. If the first detection event is the PIR detector 53 on the camera module 22, or at any time if the inferred sequence is violated, the user is so notified that one or both of the motion detector floodlights 20 is not providing a detection signal and instructed to adjust the angle of the particular motion detector floodlights 20 (or both) where no signal was detected during the trajectory 114 and to try the trajectory again.

If no sequence error has occurred, as determined at process block 115 discussed above, then at process block 116 the program 110 times the on-time and off-time intervals and records the sequence of activation of each of the three PIR detectors 42 and 53. This timing process is concluded when a third PIR detector in the imputed sequence indicates an activation at decision block 118 or optionally after activation has been detected and then no longer detected or continuously detected within a period of time, for example, 30 seconds. Otherwise, an error condition is indicated at block 119 and the user is given instructions to start over at process block 112.

As shown in FIG. 8, these measurements yield a timing profile 120 having a set of on-times 122 each identified to a particular PIR detector 42 or 53, typically but not necessarily separated by off-times 124. At process block 130, this timing profile 120 is reviewed and if the off-times 124 between on-times exceed a predetermined value (e.g., one second) per decision block 132, the user is informed at process block 134 that there is a gap between detected activity zones 100 along the trajectory 114. The user then is provided with instructions for adjusting the articulated joints 18 to eliminate that gap and then instructed to repeat this process after adjustment is made per process block 134. When no gaps indicated by off-times 124 are detected, the program 110 concludes as indicated by process block 136, and the user is instructed that a gap-less sensing region has been established.

Referring now to FIG. 7, in one embodiment these instructions to the user with respect to eliminating gaps may be text, tones or other sounds, or spoken instructions 140 delivered, for example, by the user's portable wireless device 105 or on a stationary display screen referred to by the user. When the user can carry the wireless device 105 during this process, the portable wireless device 105 may also display a representation 142 of the PIR detectors 42 and 53 and indicate the times when each one is in a sensing or on-time 122 to further help the user visualize the region of the activities zones 100 on the ground. Alternatively, this function may be provided by the indicator light 54 or momentary activation of the floodlight assemblies 40. In addition or as an alternative to the representation 142 of the timing profile 120, the display may instruct the user as to a direction (e.g., up, down, left, right) of movement of a particular motion detector floodlight 20 (left or right) necessary to close the gap and optionally may estimate the amount of articulation (e.g., 10 deg.) necessary with respect to the indicia 36 and 38 described with respect to FIG. 4. The display may offer the user the option, for example, between moving the camera module 22 or moving a motion detector floodlights 20 in order to reduce that gap.

Referring now again to FIGS. 6 and 9, in one embodiment, the camera module 22 may be activated to acquire video imagery during process blocks 115-118 as indicated by process block 158 displaying visually the activity zones 100 as visualized activity zones 162 on a display 166. This image may be generated using the timing profile 120 to produce the visualized activity zones 162 by highlighting any motion in the acquired video image during the on-times 122 and marking that motion (for example, with a number) according to the particular device responsible for the on-time being either a motion detector floodlight 20 or camera module 22. In this way, the user can obtain a camera view of each activity zone 100.

Referring again to FIG. 3, it will be appreciated that the communication between the camera module 22 and each of the detectors 42 and 53 allows flexible operation of the floodlight assemblies 40. For example, each floodlight assembly 40*a* or 40*b* may only be activated during the detection of motion in its associated activity zones 162, or, alternatively, in two or even all activity zones 162. Likewise particular detectors 42 or 53 may be deactivated, for example, when only one or two activity zones are desired.

While the above-described embodiment shows only three field-of-view motion sensors 42 and 53 and the camera 70, it will be appreciated that the principles of the present invention can be expanded to multiple such units coordinated together to provide for continuous multizone regions of greater than three activity zones 100 and that the individual units in some cases can be separated for separate mounting using different housings while inter-communicating. Generally, it will be appreciated that the camera module 22 may flexibly control the relationship between detection of motion signals from various motion sensors 42 and 53 and activation of the floodlight assemblies 40 so that a given floodlight assembly 40 may or may not be activated in time with its associated motion detector 42 or floodlight assemblies 40 may be activated at other times. Generally the floodlight assemblies 40 will include driver circuitry for switching the necessary currents for the LEDs as triggered by low-level communication signals. While the above description uses the portable wireless device 105 in communication with the user, it will be appreciated that other devices can provide this interface including the camera module 22 which may include a microphone for receiving voice commands and a speaker for providing audible cues and instructions.

While the invention contemplates use by a person walking through the camera field-of-view, it will be appreciated that another target may also be suitable for example a vehicle drone or the like.

As is generally understood to those of ordinary skill in the art, the various processors described including those in the server 98, the camera module 22, and in the portable wireless device 105 may employ any standard architecture and may include but are not limited to: a central processing unit (CPU), an array processor, a vector processor, a digital signal processor (DSP), a field-programmable gate array (FPGA), a programmable logic array (PLA), an application-specific integrated circuit (ASIC), programmable logic circuitry, and a controller. The memory associated with any of these processors can store instructions of the program 110 and/or program data as well as video data and the like. The memory can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, disks, drives, or any other suitable storage medium, or any combination thereof.

An exemplary camera module 22 capable of implementing aspects of the invention is commercially available under the Arlo Ultra brand from Arlo Technologies in Carlsbad, California, US. An exemplary base station 93 capable of incorporating aspects of the invention is commercially available under the Arlo SmartHub brand from Arlo Technologies in Carlsbad, California, US. Alternatively, base station 93 may be omitted, and its circuitry and functionality may be provided at least in part the router 94, and in other devices such as the server 98 and/or the camera module 22.

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

What is claimed is:

1. An electronic monitoring system comprising:

an escutcheon;

a camera module attached to the escutcheon, the camera module including a microcontroller and a camera that is operatively connected to the microcontroller and that is adapted to capture video images within a camera field-of-view when the camera is activated by the microcontroller;

a first motion detector and a second motion detector configured to detect motion in respective first and second fields-of-view and being independently attached to the escutcheon at locations spaced from the camera module by articulated joints allowing each of the first motion detector and the second motion detector to swivel independently of each other and the camera module for adjustment of the first and second fields-of-view in elevation and azimuth independent of each other and the camera module, the first motion detector and the second motion detector providing corresponding electronic motion signals to the microcontroller upon detection of motion in the respective first and second fields-of-view; and wherein:

the microcontroller is configured to:

activate the camera in response to an electronic motion signal of each or any of the first and second motion detectors; and wirelessly transmit detection signals corresponding to the electronic motion signals to a mobile device;

the mobile device is configured to:

determine if a gap exists between the first and second fields-of-view;

inform a user about the existence of the gap between the first and second fields-of-view;

if the gap exists, generate instructions for a user to facilitate the movement of the first motion detector and the second motion detector to eliminate the gap between the first and second fields-of-view, and advise the user when the gap has been eliminated.

2. The electronic monitoring system of claim 1, wherein a third motion detector is on the camera.

3. The electronic monitoring system of claim 1, wherein at least one of the first and second motion detectors further includes a floodlight.

4. The electronic monitoring system of claim 3, further comprising an interface connecting the first and second motion detectors to the microcontroller, and wherein the first and second motion detectors and the camera are configured such that operation of the at least one floodlight of the first and second motion detectors can be controlled by the microprocessor via the interface.

5. The electronic monitoring system of claim 1, wherein the camera field-of-view is larger in area than the field-of-view of the first and second motion detectors.

6. The electronic monitoring system of claim 1, wherein the motion detectors are passive infrared detectors.

7. The electronic monitoring system of claim 1, wherein the articulated joints provide rotation at constant azimuth and elevation.

8. The electronic monitoring system of claim 1 wherein, at least one of the first and second motion detectors further includes a floodlight, wherein the floodlight of a given motion detector provides an area of illumination having a greatest width along a width axis, wherein the field-of-view of the given motion detector has a greatest width of detection along the width axis, and wherein the articulated joints allow swiveling of the width axis about an axis of propagation of light from the floodlight.

9. An electronic monitoring system comprising:

a housing adapted to attach to a line voltage;

a camera module attached to the housing by an articulated joint movable in elevation and azimuth, the camera module housing a microprocessor and a camera that is adapted to capture video images being within a camera field-of-view when the camera is activated by the microprocessor, the camera module further including a motion detector having a first motion field-of-view aligned with the camera field-of-view and providing an electronic motion signal to the microprocessor upon detection of motion in the first motion field-of-view;

a second motion detector and third motion detector independent of the camera module, the second and third motion detectors being adapted to detect motion in respective second and third motion fields-of-view and being independently attached to the housing by articulated joints so as to allow the second motion detector and the third motion detector to swivel independently of each other and the camera module such that the second motion detector and the third motion detector are movable in elevation and azimuth independent of each other and the camera module, the second and third motion detectors each providing a corresponding electronic motion signal to the microprocessor in the camera module upon detection of motion in the respective second and third fields-of-view; and an interface connecting the second and third motion detectors to the microprocessor;

wherein:

the second and third motion detectors each include floodlights;

the second and third motion detectors and the microprocessor are configured such that operation of the floodlights of the second and third motion detectors can be controlled by the microprocessor via the interface; and the microprocessor and each of the motion detectors intercommunicate and are configured such that the microprocessor:

activates the camera for video recording in response to receipt of electronic motion signals from any of the first, second and third motion detectors; and wirelessly transmits detection signals corresponding to the electronic motion signals to a mobile device;

the mobile device is configured to:

determine if a pap exists between the first, second and third fields-of-view;

inform a user about the existence of the gap;

if the gap exists, generate instructions for a user to facilitate the movement of the second motion detector and the third motion detector to eliminate the gap; and advise the user when the gap has been eliminated.

10. A method of area monitoring comprising:

positioning a camera module including a microprocessor and a camera for capturing video images within a camera field-of-view when the camera is activated by the microprocessor;

positioning first and second motion detectors in spaced relation to the camera module and each other, the first and second motion detectors being allowed to swivel independently of each other and the camera module in elevation and azimuth, the first and second motion detectors having respective fields-of-view and providing corresponding electronic motion signals to the microprocessor upon detection of motion in the respective first and second fields-of-view; and activating the camera with the microprocessor in response to at least one electronic motion signal of the first and second motion detectors;

wherein:

the microprocessor is configured to wirelessly transmit detection signals corresponding to the at least one electronic motion signal to a mobile device; and the mobile device is configured to:

determine if a gap exists between the first and second fields-of-view;

inform a user about the existence of the gap between the first and second fields-of-view;

if the gap exists, generate instructions for a user to facilitate the movement of the first motion detector and the second motion detector to eliminate the gap between the first and the second fields-of-view; and advise the user when the gap has been eliminated.

11. The method of claim 10, further comprising a third motion detector on the camera.

12. The method of claim 10, wherein at least one of the first and second motion detectors further includes a floodlight and activates the floodlight in response to an electronic motion signal motion detector of the associated floodlight.

13. The method of claim 12, further comprising controlling operation of the floodlight of the at least one first and second motion detectors by transmitting signals to the first and second motion detectors from the microprocessor.

14. The method of claim 10, wherein the camera field-of-view is larger in area than the fields-of-view of the first and second motion detectors.

15. The method of claim 10, wherein the motion detectors comprise passive infrared detectors.

16. The method of claim 10, including positioning at least one of the first and second motion detectors by rotation at constant azimuth and elevation.

17. The method of claim 10, wherein at least one of the first and second motion detectors further includes a floodlight, wherein the floodlight of a given motion detector provides an area of illumination having a greatest width along a width axis, and wherein the field-of-view of the given motion detector has a greatest width of detection along the width axis and includes swiveling of the width axis about an axis of propagation of light from the floodlight.

* * * * *